Oct. 22, 1935.  W. J. STRAIN  2,017,871
LUBRICANT SPREADER FOR GEARS
Filed April 1, 1932  2 Sheets-Sheet 1
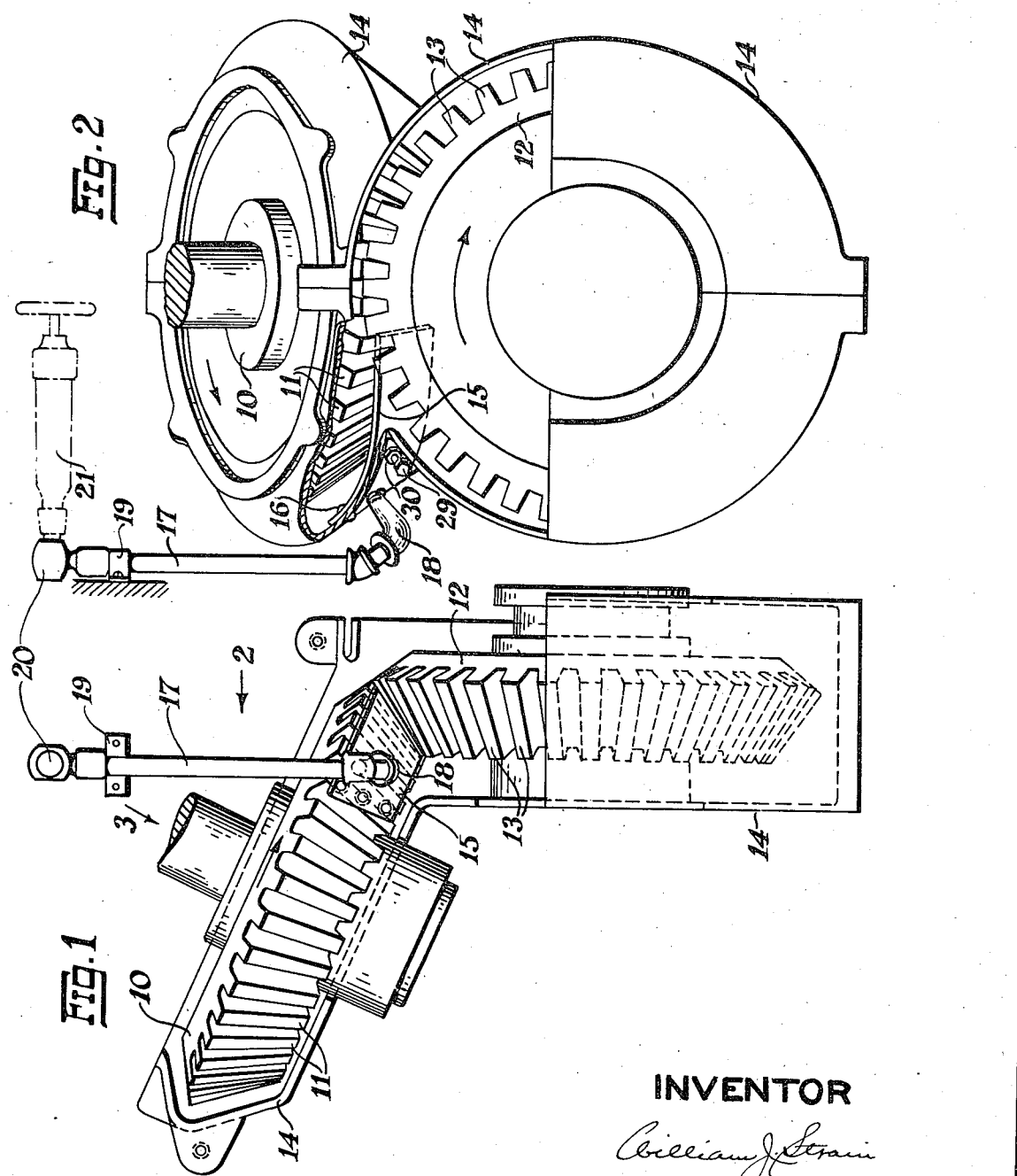
INVENTOR
William J. Strain
by John R. Tomlin
Atty.

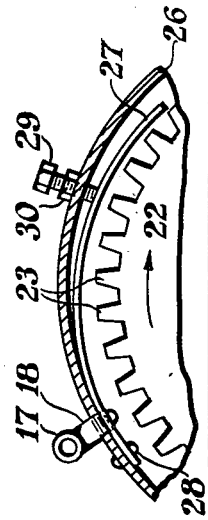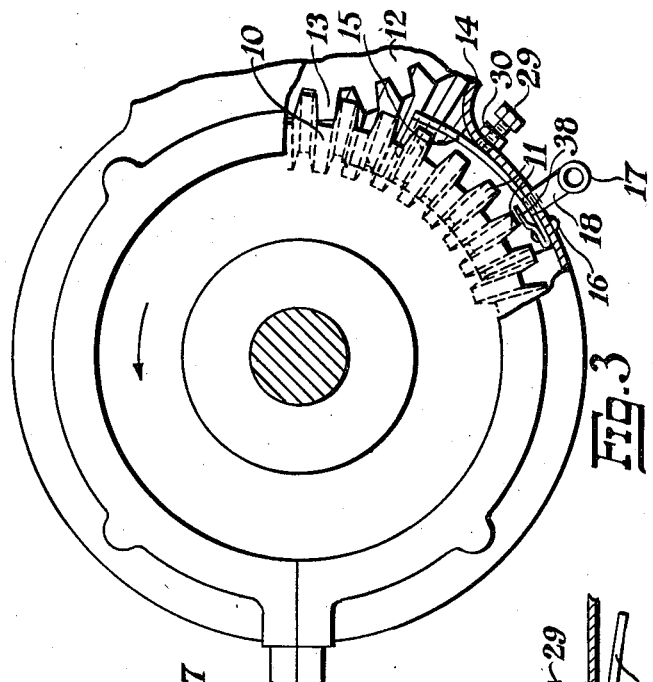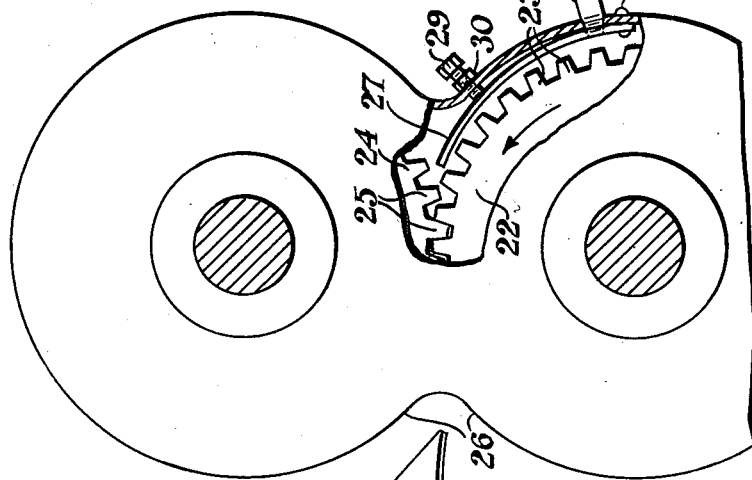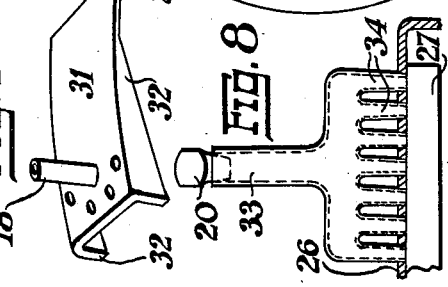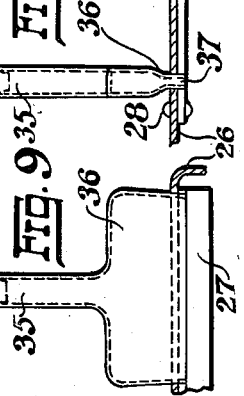

Patented Oct. 22, 1935

2,017,871

UNITED STATES PATENT OFFICE 2,017,871

LUBRICANT SPREADER FOR GEARS

William J. Strain, Upper Montclair, N. J., assignor to R. Hoe & Co., Inc., New York, N. Y., a corporation of New York; Irving Trust Company, permanent trustee Application April 1, 1932, Serial No. 602,513

7 Claims. (Cl. 184—1)

This invention relates to improvements in lubricating mechanism adapted to supply grease, gear compound or similar materials to the teeth, wearing or contact portions of gears of all kinds including spur, bevel, mitre, worm, epicyclic, external, internal, or other types.

For the sake of simplicity of description herein and to avoid unnecessary verbiage, all the delivered materials will be called lubricants and the structures to which they are applied will be called gears, it being understood however that the term lubricant comprises all or any applied materials of various viscosities and the terms gear or gear teeth comprise any moving or contact parts requiring lubricant to lessen wear and to reduce friction.

This invention is especially adapted for use with guarded or enclosed gears which are consequently inaccessible to the operator for spreading the lubricant over all contact portions thereof as is necessary for proper operation.

In certain prior cases, where the lubricant is supplied through a pipe, nozzle or opening in the guard casing, its delivery to the gear teeth is at one point, resulting in the delivery of too much lubricant adjacent to the discharge orifice and too little to other portions of the teeth, thus causing undue friction and wear of the insufficiently lubricated surfaces.

It is one of the objects of this invention to obviate such difficulty and to provide a substantially uniform delivery and application of lubricant to all the contact or wearing portions, thus reducing friction and wear.

It is also an object of this invention to provide a lubricating mechanism of generally improved construction which is simple, durable and inexpensive, as well as convenient, practical, serviceable and efficient in use.

With the foregoing and other objects in view, which will appear as the description proceeds, the invention resides in the combination and arrangement of parts, and in the details of construction hereinafter described and claimed, it being understood that various changes in the precise embodiment of the invention herein disclosed may be made within the scope of what is claimed without departing from the spirit of the invention.

The preferred embodiment of the invention is illustrated in the accompanying drawings, wherein:

Figure 1 is a side elevation of a pair of meshing bevel gears, with parts of their guard casing removed or broken away, showing the lubricant spreader;

Figure 2 is an end elevation corresponding to Figure 1, looking thereat in the direction of the arrow 2;

Figure 3 is a top plan view of the upper bevel gear of Figure 1 and part of its mate, looking in the direction of the arrow 3;

Figure 4 is an end elevation of a pair of meshing spur gears with parts of their casing broken away to show the gear teeth and the lubricant spreader;

Figure 5 is a partial end elevation of part of a spur gear and its casing in section, showing the lubricant spreader, looking in the opposite direction to that of the view of Figure 4;

Figure 6 is a plan view of the spreader plate of Figures 4 and 5;

Figure 7 is a perspective view of another form of spreader plate with side flanges adapted to confine the flow of lubricant and to deliver it initially throughout the entire length of the teeth where needed and to prevent it from flowing laterally into the spaces within the gear case adjacent to the side surfaces of the gear wheels, where it is not so useful;

Figure 8 shows another form of supply conduit adapted to deliver a plurality of streams of lubricant over the full extent of the gear teeth;

Figure 9 is a front view of still another form of supply conduit adapted to deliver a thin stream of lubricant through a narrow nozzle of about the same length as that of the gear teeth, thus insuring initial delivery to all parts of the teeth when needed; and Figure 10 is a side view of the alternate form of the delivery nozzle of Figure 9.

Referring now to the characters of reference on the drawings:—

A bevel gear 10 is mounted on a shaft as shown, rotatable therewith, and provided with gear teeth 11 meshing with the teeth 13 of the companion bevel gear 12.

These gears are mounted in the casing 14 which protects the gears, the operators and retains the lubricant to prevent it from splashing about on the floor, the product or the attendants.

A lubricant spreader plate 15 has its rear portion secured to the inside of the casing 14 by the rivets 16 and its forward portion projects preferably in a sloping curve eccentrically with respect to the periphery of the gear teeth, until its forward portion is close to the outer ends of the gear teeth, while its rear portion is at a greater distance therefrom. This provides ample storage place for viscous or semi-viscous lubricant, which, as the gear rotates, is spread between and forced upon all the surfaces of the gear teeth by the pressing action of the spreader plate 15 which is secured to the fixed casing 14, so that the gear rotation carries the lubricant forward into the narrowing space with resultant pressure and consequent distribution upon all of the contact faces.

The lubricant is initially delivered through the supply pipe 17 and the nozzle 18 which connects with the space between the spreader plate 15 and the gear teeth 11. The lubricant is preferably furnished from a grease gun 21, through the inlet elbow or connection 20, which and the pipe 17 are held in position against the machine frame or other stationary object by the clip 19.

The application of this invention to a pair of spur gear wheels is illustrated in Figures 4 and 5, in which 22 is a spur gear wheel provided with teeth 23 which mesh with the teeth 25 of the companion spur gear 24. These gear wheels are each mounted on a shaft as illustrated and adapted to rotate therewith, within the guard and casing 26 which, as shown in Figure 4, is broken away to show parts of the gears and the spreader plate 27 mounted within and secured near its rear end to the casing by the rivets 28.

This spreader plate slopes from its rear portion toward the gear teeth until its forward end almost touches their outer surfaces or it may be said to be arranged eccentrically of the gear and its teeth. This provides a considerable space between its rear portion and the gear teeth which is gradually tapered or lessened to its forward end, thus providing a reservoir for lubricant. By reason of this arrangement, the lubricant is forced against and between the teeth as the gear wheel rotates, while the spreader plate is in fixed position.

The spreader plates may be formed of resilient material secured at their rear ends to the casing, thus acting in an elastic manner if desired. As, in some instances, the guard casings are made of castings, which naturally vary in dimensions and position, adjusting means are provided for the forward portions of the spreader plates, such as the set screw 29 threaded in the casing and having a jam nut 30 to secure its position. This therefore provides means for positioning the spreader plate with respect to the gear teeth so that its forward portion may be nearer to or farther from the gear teeth as desired. In order that the spreader plate may function to economically assist the lubrication, it is preferred to have its forward end close to but not touching the ends of the gear teeth, thus gradually delivering portions of lubricant to the contact surfaces.

The spreader plate is located near the bite of the gears so as to initially guide the grease to and in the direction of the movement of their contacting surfaces.

As illustrated in Figure 7, another form of spreader plate 31, is shown, having side flanges 32 which may be of tapering shape as illustrated, in order to allow the forward end of the plate to bend elastically to a slight extent, or if desired, these flanges may be of uniform width making a stiffer plate. Such a flanged spreader plate will confine the lubricant laterally by its contact with the flanges, thus preventing side flow and insuring its deposition only on the contact surfaces of the teeth. This spreader plate 31 is also provided with a delivery nipple or nozzle 18 and is secured to the casing by rivets, not shown, passing through the holes illustrated in its rear portion.

Referring to Figure 8; this shows another form of lubricant delivery of a manifold type, having a main supply pipe 33 with a connector 20 to receive a grease gun such as 21, and the main supply pipe 33 has a plurality of branch pipes 34 which are adapted to deliver lubricant throughout the width of a spreader plate or length of the gear teeth, thus insuring a more uniform distribution to the contact parts.

Referring to Figures 9 and 10; these illustrate another form of lubricant supply means, comprising a main pipe 35 with the elbow or connector 20 to receive a grease gun, the delivery end of the pipe 35 being spread as at 36 to a length substantially equal to the width of the spreader plate or length of a gear tooth, this having a very narrow slot 37 to thereby discharge a thin film or ribbon of lubricant. This also supplies the lubricant more uniformly and where needed.

As illustrated in Figure 3, a stop member or plate 38 is provided, to prevent the grease from being discharged backwardly into the gear casing, and this insures that it will be delivered into the bite of the gears, that is between their meeting teeth and in the direction of their rotation.

The casing could also be made externally substantially concentric with the gears for the sake of best appearance, and with an integral portion of contour similar to that of the spreader plate, but as such casings are frequently made of castings which naturally vary in dimensions, such a construction would not have the best conformation, nor would it be adjustable to act most efficiently.

The casing could also have a portion externally and internally eccentric to the gears and of contour similar to that of the spreader plate herein described, but for reasons just mentioned this might not be sufficiently exact nor could it be adjustable to act most efficiently.

Having thus given a description of the apparatus, its mode of operation will be of interest:—

Lubricant is supplied by the grease gun 21 to the supply pipe and is delivered into the wider space between the ends of the gear teeth and the rear portion of the spreader plate.

As the gears rotate, the lubricant is carried from the rear to the forward end of the spreader plate and into the gradually lessening space between it and the gear teeth and is thereby forced into the spaces between the teeth and against their ends so that all contact parts are lubricated thoroughly.

The wider portion of the space between the spreader and the gear teeth acts as a reservoir to contain lubricant which is thus spread on the gear teeth. Part of the lubricant is transferred from the teeth of the gear to which it is thus delivered and spread, to the teeth of the meshing gear so that both are properly and thoroughly lubricated on all contact surfaces. A spreader plate may be provided for each gear, if desired, but it has been found that one is sufficient for a pair of gears. As gear casings are made with ample clearance and hence not to very exact dimensions, it is preferred to have the spreader plate adjustable by the screw 29 so that its end may be near the ends of the gear teeth to gradually deliver and spread the lubricant thereon. This spreader plate may also be resilient to act as a cantilever spring and yield slightly as the gears rotate while applying a spreading pressure to the lubricant after the fashion of a spatula.

The spreader plate is preferably eccentrically arranged with respect to the gear wheel and the outer ends of the gear teeth and its rear end is secured to the fixed casing, while its forward end is nearer to the gear teeth.

It will be understood that the invention may be embodied in other specific forms without departing from the spirit or essential attributes thereof, and it is therefore desired the present embodiment be considered in all respects as illustrative and not restrictive, reference being had to the appended claims rather than to the foregoing description to indicate the scope of the invention.

What I claim is:

1. A toothed gear wheel, a fixed casing therefor, a spreader plate, secured to and within said casing, with its forward end with respect to the rotation of the gear wheel nearer to the teeth of said gear wheel than its rear end, and means for supplying viscous lubricant into the space between said plate and said teeth at the rear of the plate, said means passing through the plate and a portion of the said casing, the rotation of said gear wheel causing the spreader plate to distribute the lubricant over the gear teeth.

2. A toothed gear wheel mounted within a fixed casing, an elastic spreader plate mounted in said casing with its rear portion secured thereto, its forward portion with respect to the rotation of the gear wheel being nearer to the teeth of said gear wheel than its rear portion, and means having a duct for admitting lubricant into the space between said spreader plate and said teeth at the rear of the plate, said means projecting within the casing and passing through the plate.

3. The combination with a pair of meshing gear wheels, of a spreader plate secured adjacent to the teeth of one of said gears with its forward portion with respect to the rotation of the gear wheel inclining towards said teeth, means for supplying lubricant between said plate and teeth at the rear of the plate, and a stop member at the rear of said spreader plate adapted to prevent the backward discharge of lubricant.

4. In a device for introducing a heavy lubricant to the meshing point of a pair of meshing gears, a gear casing adapted to house said gears, a spreader plate secured within the casing and having a forward adjustable portion closely adjacent the meshing point of the gears, and means having a duct through which the lubricant may be injected into a space at the rear of the plate between the spreader plate and one of the gears, said means traversing the casing wall and the plate.

5. In a device of the character described, a gear wheel having teeth, a casing, a spreader plate arranged adjacent the casing, said casing housing said gear and spreader plate, a duct extending through the casing and plate and adapted to deposit lubricant directly into the space at the rear of the plate with respect to the rotation of the gear wheel and between said plate and gear teeth, and means secured to the spreader plate for preventing lubricant from flowing laterally away from said plate.

6. In a device of the character described, the combination of a gear having teeth, a spreader plate having a portion inclined toward the teeth of the gear, a duct projecting through the spreader plate and adapted to permit the ejecting of lubricant into the space at the rear of the plate with respect to the rotation of the gear and between the gear teeth and the spreader plate, and manually operable means for variably positioning the forward portion of the plate relatively to the gear teeth.

7. In a device of the character described, the combination of a casing, a gear having teeth, a spreader plate secured to the casing and arranged with its forward edge with respect to the rotation of the gear adjacent the said teeth, and a duct projecting through the casing wall and the rearward portion of the spreader plate, said duct serving to project lubricant radially against the gear.

WILLIAM J. STRAIN.